United States Patent [19]
Bond

[11] Patent Number: 4,593,573
[45] Date of Patent: * Jun. 10, 1986

[54] INVERSION CAM AND CYLINDER POWER MEANS

[76] Inventor: Irvin D. Bond, 10270 Aller Rd., Clarkston, Mich. 48016

[*] Notice: The portion of the term of this patent subsequent to Dec. 4, 2001 has been disclaimed.

[21] Appl. No.: 682,847

[22] Filed: Dec. 18, 1984

[51] Int. Cl.⁴ .............................................. F16H 21/44
[52] U.S. Cl. .......................................... 74/104; 74/107
[58] Field of Search ......................... 74/104, 107, 102

[56] References Cited

U.S. PATENT DOCUMENTS

| 2,143,537 | 1/1939 | Bliss | 74/104 |
| 3,081,815 | 3/1963 | Toensing | 74/107 |
| 3,482,830 | 12/1969 | Sendoykas | 74/107 |
| 3,570,835 | 3/1971 | McPherson | 74/104 |
| 4,195,534 | 4/1980 | Prince | 74/107 |
| 4,485,685 | 12/1984 | Bond | 74/103 |

FOREIGN PATENT DOCUMENTS 10554 of 1914 United Kingdom ................. 74/107

Primary Examiner—Lawrence J. Staab
Attorney, Agent, or Firm—Charles W. Chandler

[57] ABSTRACT

A piston and cylinder actuator is connected to a cam for converting the uniform linear motion of a piston rod with respect to a power cylinder to rotate a shaft in a controlled acceleration and then deceleration for turning a driven member such as a workpiece over.

3 Claims, 5 Drawing Figures

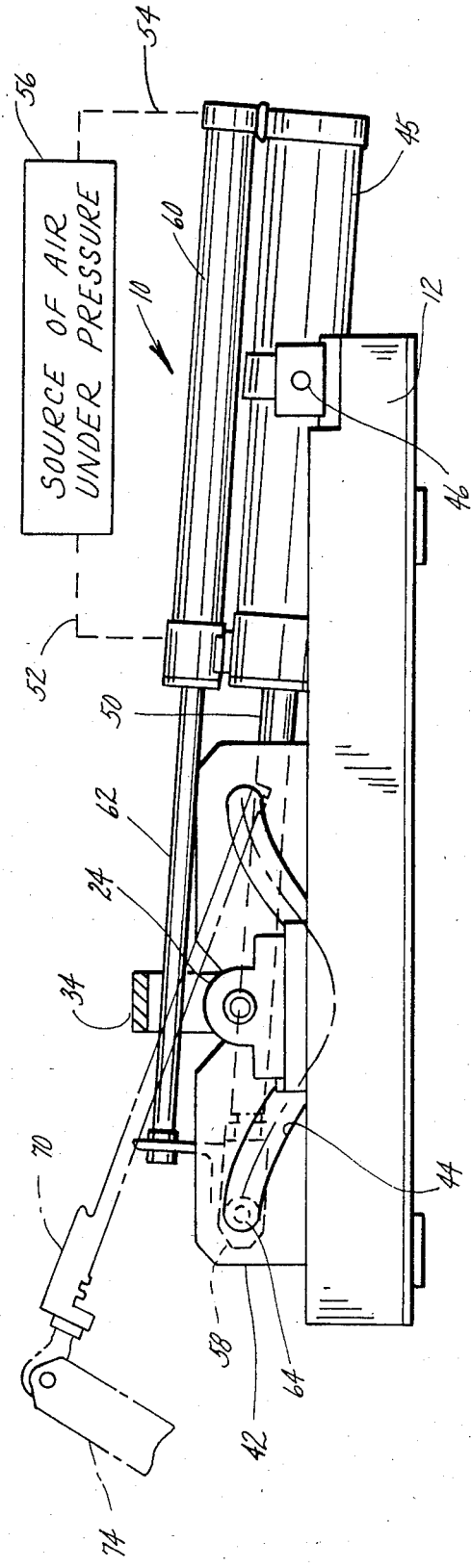
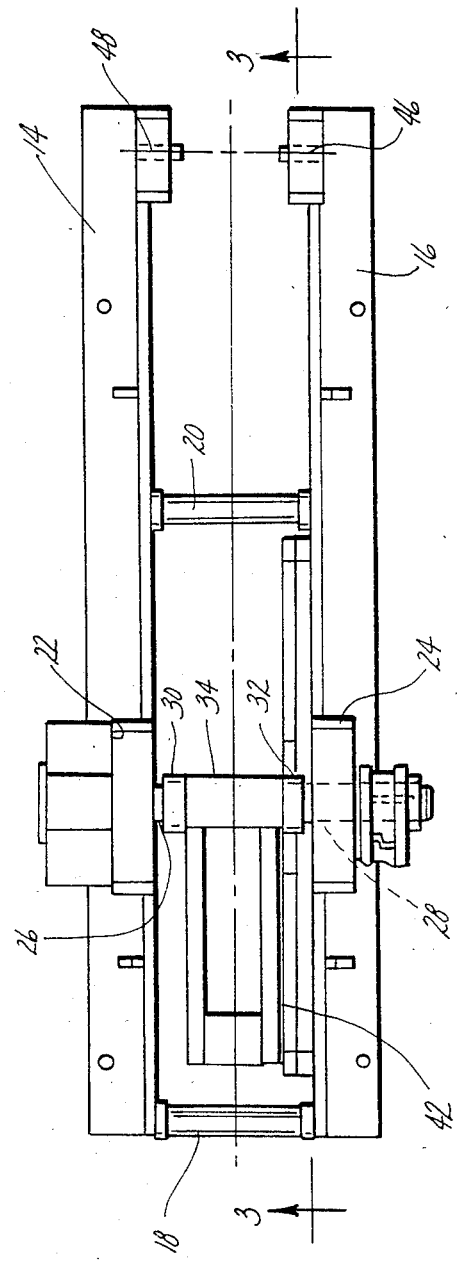

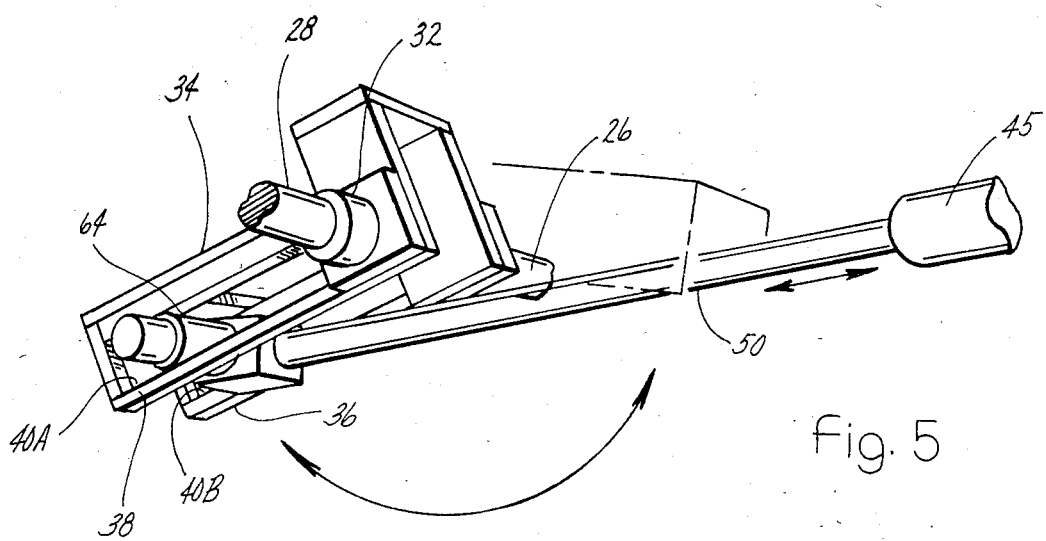

INVERSION CAM AND CYLINDER POWER MEANS

BACKGROUND OF THE INVENTION

This invention is related to power cylinder actuators, and more particularly to means for rotating a shaft with a power cylinder such that a driven member is inverted in a programmed motion as the piston rod is extended from the cylinder at a uniform rate of motion.

There are a variety of mechanical applications in which a power cylinder is employed for rotating a drive shaft. Usually a yoke is connected between the piston rod and the shaft, however, the rate of rotation of the shaft usually cannot be readily controlled because the yoke provides a direct linkage between the piston rod and the shaft. Further, there is a position in which the longitudinal axis of the piston rod passes over the shaft axis in which the piston rod will frequently lock up.

SUMMARY OF THE INVENTION

The broad purpose of the present invention is to provide a power cylinder actuator in which the yoke connecting the piston rod and the shaft is such that as the piston rod is being either extended or retracted, the shaft is rotated in either a controlled acceleration or a controlled deceleration depending upon the curvature of a sinuous slot in a cam plate that defines the relative motion between the piston rod and the shaft.

In the preferred embodiment of the invention, which will be described in greater detail, the shaft and the piston rod are mounted on a base. The shaft may be connected to any suitable driven member that is to be turned over.

A yoke is carried by the shaft and connected to the piston rod by a roller that reciprocates in a slot in the yoke as it is moved by the piston rod end about the axis of rotation of the shaft. The piston rod also carries a second roller that moves in a sinuous slot in a cam plate mounted adjacent the shaft. The curvature of the slot defines the rate of acceleration and deceleration of the shaft as the piston rod is being extended from the cylinder.

One advantage of such an arrangement is that the accuracy of the motion of the shaft depends on the cam and not on the cylinder as in conventional mechanisms. Further, the cam permits the shaft to achieve at least a 180 degree rotation as the rod is being fully extended. The cam eliminates the dead spot that prevents a conventional yoke from being used for a full 180 degree rotation. Further, the beginning and ending positions of the shaft rotation can be defined according to the shape of the cam.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is an elevational view of an inversion cam and power cylinder arrangement illustrating the preferred embodiment of the invention;

FIG. 2 is a fragmentary plan view of the embodiment of FIG. 1;

FIG. 5 is a fragmentary, perspective, schematic view of the piston rod and yoke connection.

DESCRIPTION OF THE PREFERRED EMBODIMENT

Figure 3:
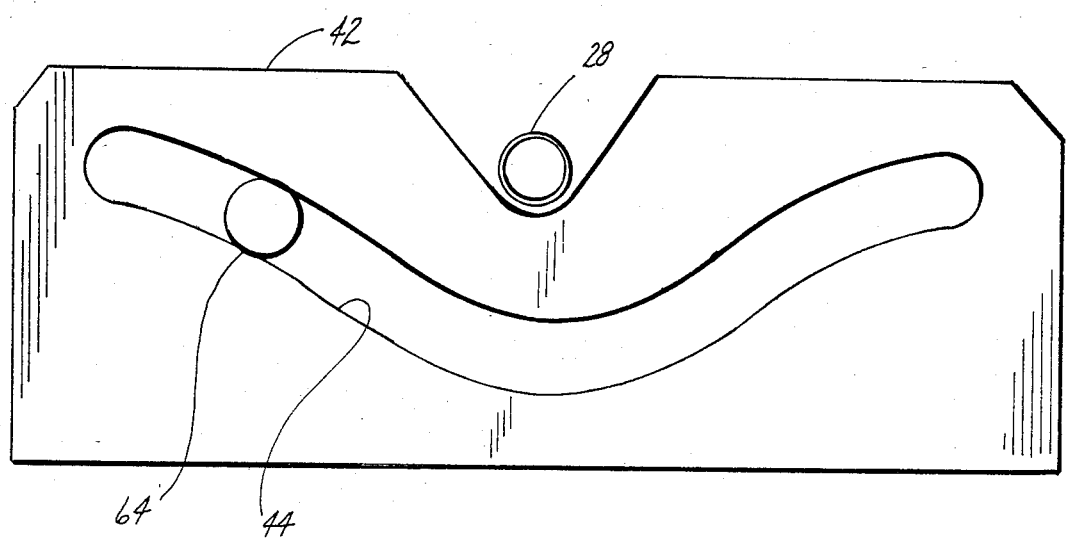
FIG. 3 is an enlarged fragmentary view of the cam plate as seen along lines 3—3 of FIG. 2.

Referring to the drawings, FIG. 1 illustrates a perferred power cylinder actuator 10 comprising a base 12 formed of a pair of angle members 14 and 16 connected together by frame members 18 and 20.

A pair of pillow blocks 22 and 24 are mounted on the base and support a pair of axially spaced shaft means 26 and 28 which are aligned along a common axis of rotation. A pair of collars 30 and 32 are carried on shaft means 26 and 28, respectively. A yoke 34 is attached to the two collars as illustrated in FIG. 5. The yoke has a pair of side walls 36 and 38 having elongated slots 40A and 40B.

Cam plate 42 is mounted on the base adjacent shaft 28. The cam plate has a sinuous cam slot 44 disposed about the axis of rotation of the two shafts.

Pneumatic cylinder 45 is mounted adjacent the opposite end of the base by pivot means 46 and 48. The cylinder has a conventional piston rod 50 that is movable along a linear path of motion with respect to the cylinder. The cylinder is connected by conduit means 52 and 54 to a source of air under pressure 56 in the manner well known to those skilled in the art so that the piston rod moves at a uniform rate of motion with respect to the cylinder.

The outer end of the piston rod carries clevis 58. A hydraulic cylinder 60 is mounted in tandem with cylinder 45 and has piston rod 62 connected by the clevis to the outer end of piston rod 50 so the two piston rods move together to reduce any fluctuations in piston rod 50 as it is being extended or retracted. Piston rod 62 functions in a manner similar to a shock absorber.

Roller means 64 are carried on the outer end of piston rod 50. As best illustrated in FIGS. 3 and 5, roller means 64 extend laterally with respect to the piston rod and are mounted in both slot 44 of the cam as well as slots 40A and 40B of the yoke. Thus, as the piston rod is moved from a fully retracted position toward a fully extended position, the end of the piston rod follows the curvature of cam slot 44. Since the piston rod is also connected to the shaft by means of the yoke, as the piston rod is fully extended, the end of the piston rod travels around the axis of rotation of the shafts to swing the yoke and rotate the shafts. Similarly, as piston rod 50 is retracted, it swings the yoke and rotates the two shafts in the opposite direction.

Although the yoke provides means for rotating the shafts, the relationship between the rotation of the shaft and the piston rod motion is defined by the shape of cam slot 44. For this reason the slot is carefully provided with a predetermined curvature depending upon the desired rate of shaft rotation. For example, as the piston rod is extended in a uniform rate of motion, the shafts will initially move from the right end of the slot as viewed in FIG. 1, in an increasing rate of rotation. Then about the mid-point of the slot, the shafts will continue in a decreasing rate of rotation. The curvature of the slot then defines the rate of rotation of the shafts. Similarly, the starting and ending points of the shafts' rotation can be controlled by defining the starting and ending points of the piston rod motion with respect to the slot, that is we can achieve less than 180 degree rotation or we can over-rotate the shaft, if necessary.

Figure 4:
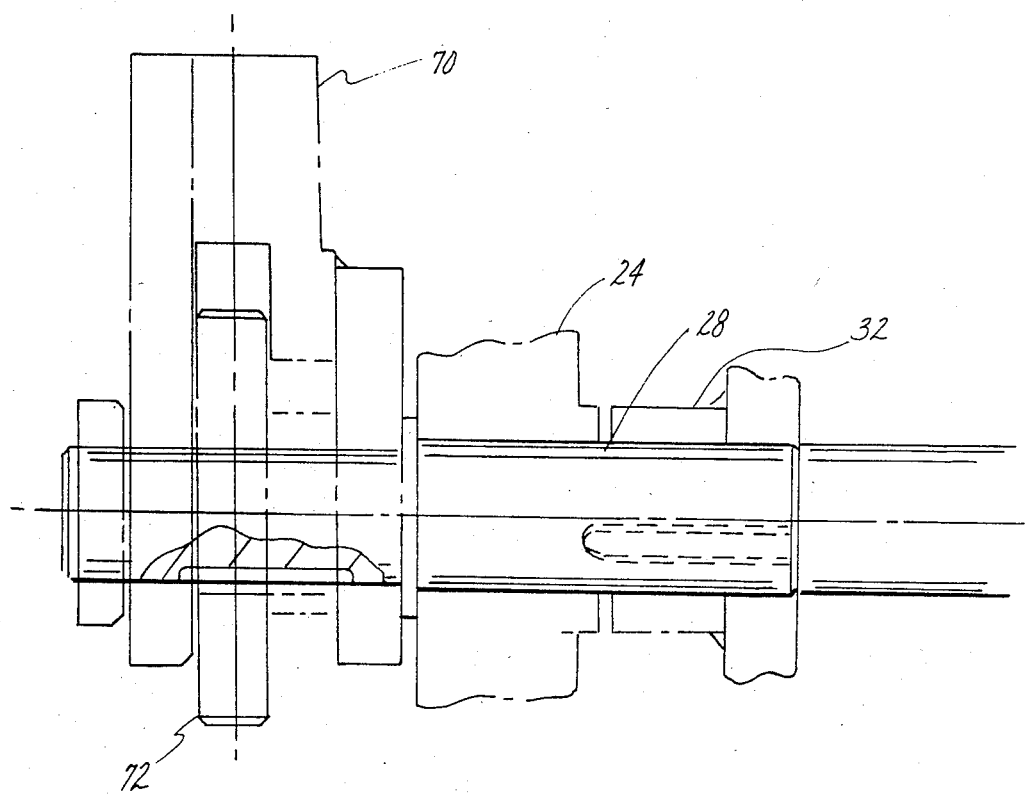
FIG. 4 is an enlarged fragmentary view of the connection between the shaft and a driven member.

Referring to FIGS. 2 and 4, shaft 28 can drive any suitable means such as a rack 70 by means of a gear 72 carried on the end of shaft 28. The rack, in turn, is connected to lifting means 74 to turn over a workpiece (not shown).

Having described my invention, I claim:

1. Power means comprising:

a base;

power cylinder means including a cylinder having a piston rod moveable in a reciprocal, linear path of motion with respect to the cylinder, and means pivotally supporting the power cylinder means for pivotal motion on the base;

a pair of axially spaced shafts mounted on the base for rotation about an axis fixed with respect to the base, said axis of rotation being disposed generally transverse to the linear path of motion of the piston rod;

a yoke having a pair of spaced sides attached to the pair of shafts such that as the cylinder is moved in a pivotal motion on the base, the yoke and the shafts are moved in a pivotal motion about said axis of rotation, the sides of the yoke having slot means;

a cam plate having a curved cam slot mounted on the base; and cam roller means carried on the piston rod and moveably received in both the slot means in the yoke and the cam slot in the cam plate such that the piston rod is moveable along a path of motion traversing said axis of rotation between the shafts, whereby as the piston rod is moved at a uniform rate of motion with respect to the cylinder, the shafts are rotated at a variable rate of motion in a variance depending upon the curvature of the cam plate slot.

2. A combination as defined in claim 1, in which the cam plate slot is such that as the piston rod is moved with respect to the cylinder at a uniform rate of motion, the shaft is rotated at an initial increasing rate of rotation and then in a decreasing rate of rotation.

3. A combination as defined in claim 1, in which the cam plate has a sinuous slot disposed about the axis of rotation of the shaft, and the cam roller carried on the piston rod is disposed in the sinuous slot so as to follow a sinuous path of motion as the piston rod is being extended with respect to the cylinder.

* * * * *